Patented Sept. 21, 1943

2,329,718

UNITED STATES PATENT OFFICE 2,329,718

CELLULOSE ESTERS

Clifford I. Haney and Mervin E. Martin, Cumberland, Md., assignors to Celanese Corporation of America, a corporation of Delaware No Drawing. Application July 14, 1942,
Serial No. 450,914

7 Claims. (Cl. 260—230)

This invention relates to a process for the preparation of organic esters of cellulose and relates more particularly to the production of cellulose acetate and other lower fatty acid esters of cellulose.

An object of our invention is the production of organic esters of cellulose of increased stability so that stabilization treatments may be substantially reduced or entirely eliminated.

Another object of our invention is the production of organic esters of cellulose which are particularly adapted for use in molding operations.

Other objects of our invention will appear from the following detailed description.

In the process of preparing organic esters of cellulose, the esterification of cellulose is usually carried out by treating cellulose with an organic acid anhydride in the presence of a catalyst such as sulfuric acid and an organic acid diluent, or solvent, for the ester of cellulose being formed. The esterified cellulose is obtained in the form of a viscous, homogeneous solution in the organic acid diluent, to which water is added in amounts sufficient to convert any organic acid anhydride remaining into the corresponding acid. The cellulose ester, usually after the addition of a further quantity of water, is permitted to hydrolyze or ripen to develop the desired solubility characteristics. Water and/or other non-solvent for the cellulose ester is then added in sufficient amounts to precipitate the cellulose ester from solution. The cellulose ester is finally washed with water to free it of acids as much as is possible.

In the preparation of cellulose acetate in accordance with the above process the cellulose, with or without a pretreatment with organic acids or organic acids containing some sulphuric acid, is usually acetylated by treatment with acetic anhydride and a catalyst, such as sulphuric acid, in the presence of glacial acetic acid as a solvent for the cellulose acetate formed. The sulphuric acid catalyst is normally present in amounts of from 9 to 15%, or even 20%, on the weight of the cellulose. Part of this sulphuric acid may be introduced in the pretreatment which is designed to make the cellulose more reactive. When the acetylation is completed, water is stirred into the reaction mixture to convert the excess acetic anhydride to acetic acid, and, after the addition of a further amount of water, the resulting solution of cellulose acetate in acetic acid is permitted to stand until the desired solubility characteristics are reached. During this standing or ripening period, not only are acetyl groups split off, but in addition combined sulphuric acid is split off. When the desired solubility characteristics are reached, further ripening is halted and the mixture is treated with a large excess of water or other non-solvent to precipitate the cellulose acetate. The precipitated cellulose acetate is washed with water to remove as much acid and other non-cellulose ester materials as possible and is then subjected to a stabilizing treatment, usually by heating it in suspension in very dilute sulphuric acid, with the object of still further reducing its content of combined sulphuric acid. The degree of stability is measured by the degree of acidity developed when a sample of cellulose acetate is treated with distilled water under conditions of elevated temperature and pressure for a predetermined period of time. The development of excessive acidity denotes a product of unsatisfactory stability. The lack of stability results in a product which has a tendency to decompose, degrade and/or discolor.

We have now discovered that cellulose acetate, as well as other organic esters of cellulose, of improved stability may be prepared by a novel ripening process. In accordance with the process of our invention, these improved products are obtained if the acid catalyst employed during the esterification reactions is completely neutralized to form a neutral salt and the cellulose ester in solution is ripened to the desired solubility characteristics in the presence of an added organo-mineral acid. By ripening the cellulose ester to the desired solubility characteristics by our novel process, not only is the stability of the resulting ester improved, but the product obtained thereby is particularly suitable for use in molding operations.

The organo-mineral acids which may be employed in accordance with our invention are those acids which are obtainable by replacing one or more hydroxy groups of a di- or poly-basic mineral acid with one or more aryl, alkyl, aralkyl or other organic radicles, one or more hydroxy groups still remaining therein. By the term organo-mineral acids, we likewise mean to include the acid esters of the mineral acids formed by the reaction of said acids with alcohols. Examples of such organo-mineral acids are methyl sulfonic acid, ethyl-sulfonic acid, sulfated ethyl alcohol, propyl di-sulfonic acids, benzyl sulfonic acid, benzene sulfonic acid, phenol sulfonic acid, naphthalene sulfonic acid, toluene sulfonic acid, xylene sulfonic acid, methyl phosphinic acid, phenyl phosphinic acid, and like derivatives of dibasic or other polybasic mineral acids.

The neutralization of the acid catalyst present in the esterification solution may be carried out conveniently by the addition of a suitable neutralizing agent to the solution. The neutralizing agent employed may be a salt of magnesium or calcium, such as magnesium acetate, calcium acetate, magnesium carbonate, or calcium carbonate. Zinc acetate or zinc oxide may also be employed as the neutralizing agent, or a mixture of any two or more of the foregoing compounds may be used. The acid catalyst present may be neutralized in part with one neutralizing agent, or a mixture of neutralizing agents, and the remainder neutralized with another of said neutralizing agents, or a mixture of the latter. The neutralization is preferably carried out by employing a mixture of magnesium acetate and calcium acetate to neutralize part of the acid catalyst present and then neutralizing the remainder with magnesium acetate.

The quantity of organo-mineral acid added for ripening after the neutralization is completed may vary. Thus, in the preparation of cellulose acetate in accordance with our process the organo-mineral acid added for ripening may be from 5 to 50% on the weight of cellulose acetylated. Preferably, we employ about 8 to 20% of organo-mineral acid on the weight of the original cellulose acetylated.

The water for ripening may be added together with the organo-mineral acid, the latter being dissolved therein, or the water may be added separately. The amount of water added for ripening may be from 25 to 100% on the weight of the cellulose acetylated. The water may be added all at once, or, where larger quantities are employed, the water may be added in stages, so as not to cause the cellulose acetate to precipitate from solution.

The cellulose acetate is then allowed to ripen at a temperature of from 30 to 100° C. for from 10 to 100 hours, depending upon the solubility characteristics desired in the cellulose acetate. The longer the ripening, the greater will be the hydrolyzing effect and the lower the resulting acetyl value of the cellulose acetate with consequent variation in solubility characteristics. After the cellulose acetate has been ripened to the desired solubility characteristics it may be precipitated from solution by the addition of an excess of water, and may be washed and dried.

Prior to acetylation the cellulose may, for example, be pretreated with acetic acid or formic acid, or a mixture of these acids, in order to render it more reactive. The acids may be present in a small amount, say, for example, from 1 to 50% on the weight of the cellulose, or in much larger quantities, for example on the order of 100%, 200% or even 300% on the weight of the cellulose, and may contain a small quantity of sulphuric acid, for instance ½ to 1 or 2% on the weight of the cellulose. The pretreatment is preferably allowed to go on for some hours, for example overnight, though much shorter periods produce the desired results when sulfuric acid is present. The pretreated cellulose is then treated with acetic anhydride and sulphuric acid in appropriate amount to bring about acetylation.

The cellulosic materials esterified in accordance with our process may be any suitable form of cellulose or cellulose derivative. It may be cotton, cotton linters, wood-pulp, regenerated cellulose, or other cellulosic material obtainable from various other sources such as grasses, straws, hulls and the like.

In order further to illustrate our invention, but without being limited thereto, the following example is given:

*Example*

170 parts by weight of cotton are acetylated with 358 parts of acetic anhydride, 1080 parts of acetic acid and 18 parts of sulfuric acid. The time of acetylation is 4 hours during which time the mixture is allowed to attain a peak temperature of 35° C. After acetylation is completed, water in an amount sufficient only to react with any excess acetic anhydride is added to the reaction mixture.

There is then added to the acetylation mixture sufficient neutralizing agent to neutralize 50% of the sulfuric acid present. The neutralizing agent comprises a mixture of magnesium acetate and calcium acetate obtained by reacting calcined dolomite in dilute acetic acid to form said acetates, the resulting clear aqueous solution being employed as the neutralizing agent. After this neutralizing agent is added, the remainder of the sulfuric acid is neutralized by adding sufficient magnesium acetate. Water for ripening is added together with 15 parts by weight of toluene sulfonic acid, the total amount of water present for ripening being 40% on the weight of the original cellulose acetylated. Ripening is carried out at 35° C. for 96 hours and the cellulose acetate is then precipitated by the addition of an excess of water, bleached, washed neutral, boiled in water for fifteen minutes, washed neutral and dried. The resulting cellulose acetate has an acetyl value of about 55% (calculated as acetic acid), is of excellent stability and suffers little or no loss in viscosity upon being subjected to a molding operation.

While our invention is particularly described in connection with the acetylation of cellulose employing sulphuric acid as catalyst, other catalysts may be used as well, such as, for example, phosphoric acid, or mixtures of phosphoric acid and sulphuric acid. Preferably, we employ sulphuric acid alone without any other mineral acid present during acetylation. In a similar way employing the proper esterifying agent or agents, other cellulose esters may be prepared, for example, the cellulose esters of propionic, butyric or similar acids, or mixed esters, for example, cellulose acetate-propionate or cellulose acetate-butyrate.

It is to be understood that the foregoing detailed description is merely given by way of illustration and that many variations may be made therein without departing from the spirit of our invention.

Having described our invention, what we desire to secure by Letters Patent is:

1. Process for the preparation of organic esters of cellulose of increased stability, which comprises esterifying cellulose by means of a lower fatty acid anhydride in the presence of a catalyst selected from the group consisting of sulfuric acid and phosphoric acid, neutralizing all of the catalyst present in a plurality of stages by the addition to the esterification mixture of neutralizing agent selected from the group consisting of magnesium, calcium and zinc compounds, adding to the esterification mixture water together with a polybasic inorganic mineral acid containing at least one free hydroxy group and another hydroxy group having as a substituent a monovalent hydrocarbon radicle selected from the group consisting of aryl, alkyl and aralkyl radicles, and permitting the lower fatty acids ester of cellulose produced to ripen.

2. Process for the preparation of cellulose acetate of increased stability, which comprises acetylating cellulose by means of acetic acid anhydride in the presence of a catalyst selected from the group consisting of sulfuric acid and phosphoric acid, neutralizing all of the catalyst present in a plurality of stages by the addition to the acetylation mixture of neutralizing agent selected from the group consisting of magnesium, calcium and zinc compounds, adding to the acetylation mixture water together with a polybasic inorganic mineral acid containing at least one free hydroxy group and another hydroxy group having as a substituent a monovalent hydrocarbon radicle selected from the group consisting of aryl, alkyl and aralkyl radicles, and permitting the cellulose acetate to ripen.

3. Process for the preparation of organic esters of cellulose of increased stability, which comprises esterifying cellulose by means of a lower fatty acid anhydride in the presence of a catalyst selected from the group consisting of sulphuric acid and phosphoric acid, neutralizing all of the catalyst present in a plurality of stages by the addition to the esterification mixture of neutralizing agent selected from the group consisting of magnesium, calcium and zinc compounds, adding to the esterification mixture water together with toluene sulfonic acid, and permitting the lower fatty acid ester of cellulose produced to ripen.

4. Process for the preparation of cellulose acetate of increased stability, which comprises acetylating cellulose by means of acetic acid anhydride in the presence of a catalyst selected from the group consisting of sulfuric acid and phosphoric acid, neutralizing all of the catalyst present in a plurality of stages by the addition to the acetylation mixture of neutralizing agent selected from the group consisting of magnesium, calcium and zinc compounds, adding to the acetylation mixture water together with toluene sulfonic acid, and permitting the cellulose acetate to ripen.

5. Process for the preparation of cellulose acetate of increased stability, which comprises acetylating cellulose by means of acetic acid anhydride in the presence of sulfuric acid as catalyst, neutralizing a portion of the catalyst by the addition to the acetylation mixture of a neutralizing agent comprising a mixture of magnesium acetate and calcium acetate, neutralizing the remainder of the sulfuric acid by the addition to the acetylation mixture of magnesium acetate, adding water and toluene sulfonic acid to the acetylation mixture and permitting the cellulose acetate produced to ripen.

6. Process for the preparation of cellulose acetate of increased stability, which comprises acetylating cellulose by means of acetic acid anhydride in the presence of sulfuric acid as catalyst, neutralizing a portion of the catalyst by the addition to the acetylation mixture of a neutralizing agent comprising a mixture of magnesium acetate and calcium acetate, neutralizing the remainder of the sulfuric acid by the addition to the acetylation mixture of magnesium acetate, adding water and from 5 to 50%, based on the weight of the cellulose originally present, of toluene sulfonic acid to the acetylation mixture, and permitting the cellulose acetate produced to ripen.

7. Process for the preparation of cellulose acetate of increased stability, which comprises acetylating cellulose by means of acetic acid anhydride in the presence of sulfuric acid as catalyst, neutralizing a portion of the catalyst by the addition to the acetylation mixture of a neutralizing agent comprising a mixture of magnesium acetate and calcium acetate, neutralizing the remainder of the sulfuric acid by the addition to the acetylation mixture of magnesium acetate, adding to the acetylation mixture water in an amount equal to 40%, based on the weight of the cellulose originally present, and 8.8%, based on the weight of the cellulose originally present, of toluene sulfonic acid, and permitting the cellulose acetate produced to ripen at a temperature of 35° C. for 96 hours.

CLIFFORD I. HANEY.
MERVIN E. MARTIN.